April 12, 1949.  D. E. JACK  2,467,312
SHAFT SEAL
Filed June 20, 1947

INVENTOR.
DELBERT E. JACK
BY
Toulmin & Toulmin
ATTORNEYS

Patented Apr. 12, 1949

2,467,312

UNITED STATES PATENT OFFICE 2,467,312

SHAFT SEAL

Delbert E. Jack, New York, N. Y., assignor to The Duriron Company, Inc., Dayton, Ohio, a corporation of Ohio Application June 20, 1947, Serial No. 755,963

3 Claims. (Cl. 286—11.14)

The present invention relates to shaft seals and more particularly to those employed in connection with centrifugal pumps.

The impeller of such pumps is usually carried on the end of a shaft and the latter is supported in an outboard bearing. The impeller is rotated at a fast speed so that a tremendous pressure is built up in the casing of the pump. It is essential that none of the liquid which may be forced out of the casing through leakage shall creep along the shaft toward the bearing where it might cause considerable damage. Packings of various types have been employed for this purpose, usually a body of fibrous material saturated with oil but these elements have not been completely satisfactory since they require replenishment of the oil and frequent repacking.

The primary object of the invention is to provide an improved seal for shafts which are subjected to creepage fluid impelled by strong pressures.

Another object is to provide an improved form of obstruction to leakage fluid which is tough and hard wearing, therefore requiring only very infrequent replacement.

Still another object is to provide a seal, particularly for shafts of impeller pumps and in which the obstruction to flow of fluid is highly effective and offers the minimum friction to the rotating shaft.

A further object is to provide an improved seal in which the sealing element is constituted of a material which is not susceptible to attack by acid, is highly flexible, and can withstand extremely high and low temperatures.

The final object of the invention is to provide a seal in which all of the parts are of a solid character and no fibrous packing material or lubricant is necessary.

The above objects are attained, in brief, by providing a cup shaped member made of tetrafluoroethylene resin having an internal tapered surface which cooperates with a tapered surface on a gland member for producing a strictly fluid tight joint at the surfaces. In addition, the outer peripheral surface of the cup shaped member is sprung slightly outwardly against the hub of the member casing and thus producing a fluid tight joint at this surface.

Figure 1:
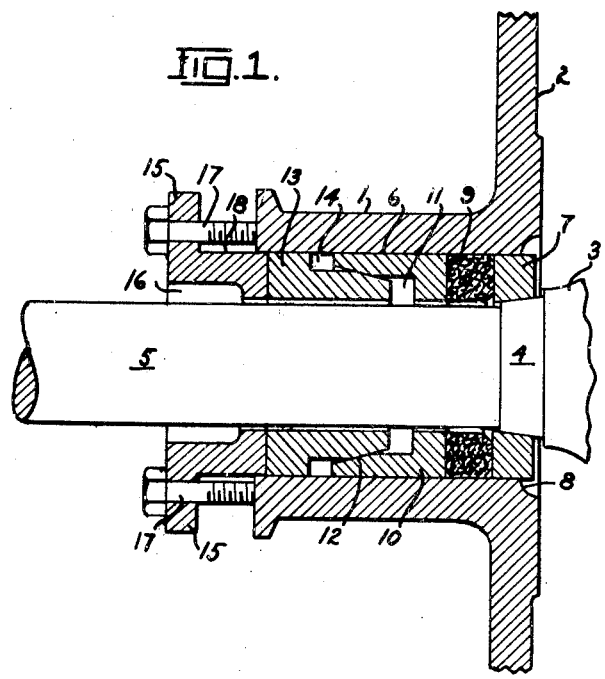
Figure 2:
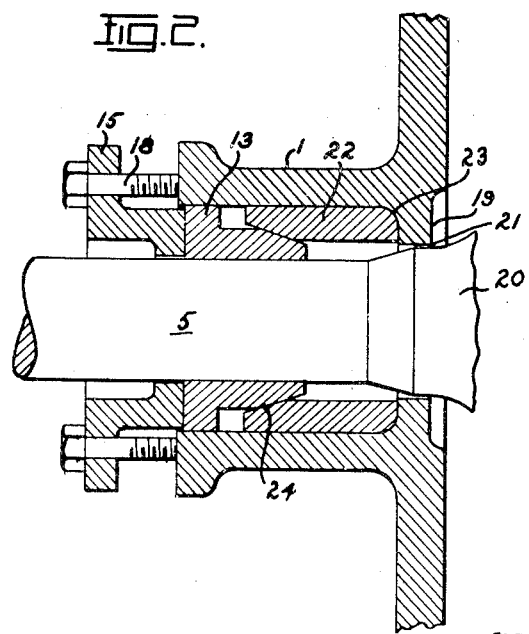

The invention will be better understood when reference is made to the following description and the accompanying drawings in which:

Fig. 1 represents a cross-sectional view of the improved seal while Fig. 2 illustrates a modified form of the seal.

Referring to Fig. 1, numeral 1 designates a hollow hub which projects outwardly from the casing 2 of an impeller pump (not shown). The hub end of the impeller is indicated at 3 and is provided with a conically shaped shoulder 4 forming part of a shaft 5. There is an annular space between the interior surface 6 of the hub 1 and the shaft 5, this space being used to house the elements of the improved seal. The collar 7 or ring of metal having a tapered bore is pressed or otherwise secured to the shoulder 4. This collar has an outer diameter so as snugly but slidably to be received by the surface 6 and if desired a grooved recess 8 is formed at the inner surface of the casing 2 at the position of the collar 7.

A graphite sealing ring 9 is loosely mounted on the shaft 5 and is slidably but snugly received by the bore 6. This sealing ring may, if desired, be cemented to the collar 7 in which case it will rotate at the same speed as the collar. However, under other circumstances the ring may be physically independent of the collar and in operation may rotate at a speed considerably less than that of the collar but without creating undue frictional heat because the graphite is of a lubricant character.

Directly abutting the graphite ring, there is a cup shaped member 10 in which the recess 11 is fairly deep and terminates at the outer or lip portion in a tapered surface 12. This taper is preferably of the order of 15° with the horizontal plane passing through the longitudinal axis of the shaft. The outside or peripheral diameter of the member 10 is such as to be snugly but slidably received by the surface 6 and there is an opening through the member through which the shaft slidably projects.

For reasons which will appear more fully hereinafter, the member 10 is made of resin, preferably tetrafluoroethylene resin or copolymers or interpolymers of this material. Materials of this character are flexible, can withstand acid and heating, are chemically inert and can withstand pressures over a long period of time without any appreciable deformation or extrusion. The unexpected property that I have discovered in the use of the material as a seal is its low torque resistance, i. e., relatively small co-efficient of friction so that little or no heat is developed at the contact surfaces with the shaft. The material is extremely tough and not susceptible to friction but instead has a high degree of yieldability.

There is a gland 13 having a shouldered portion 14 which projects into the recess of the member 10. The ends of the shouldered portion 14 are tapered, preferably at an angle of 15° as in the case of the tapered surface 12, the arrangement being such that when horizontal pressure is applied to the gland the tapered surfaces of the member 10 and of the gland are pressed closely together to form a perfect fluid tight seal at these surfaces. Moreover, the pressure of the gland 13 into the member 10 also causes the lip of the member 10 to expand slightly outwardly against the interior surface of the hub 1 so as to provide at this surface a strictly fluid tight joint. The gland 13 is preferably made of an alloy which is not attackable by acid and a clearance may be provided between this member and the shaft 5. If desired, the gland may also be made of resin similar to the material of the member 10 so that the wear at the tapered sealing surface, however slight, is borne equally by the gland and the cup shaped member.

For forcing the gland member 13 into the cup shaped member and along the shaft I may provide the usual gland plate 15 having a counter-bored opening 16 so as to reduce the size of the bearing surface on the shaft. This gland plate is provided with a plurality of bolts 17 which pass through the flange portion of the plate and are threaded into the reinforced end of the hub 1. The gland plate has a shouldered portion indicated at 18 which is loosely received by the surface 6 of the hub and is adapted to bear against the outer flat surface of the gland 13. Thus, as the bolts 17 are rotated the gland plate portion 18 is caused to press the gland 13 farther into the lip extension of the cup shaped member 10 in order to provide a highly effective liquid and gas seal at the tapered surfaces. As explained hereinbefore, the carbon ring 9 may be caused to rotate at the same speed as the collar 7 or if desired may precess with respect to the collar, in any case providing a lubricating effect between the stationary member 10 and the rotating collar.

Fig. 2 shows a modification of my improved seal. Instead of providing a collar which is affixed to the shaft 5 carrying the impeller, an annular extension 19 is formed on the casing 2, this extension projecting inwardly almost as far as the enlargement 20 on the shaft but leaving sufficient clearance as indicated at 21. The use of the gland plate 15 and the gland member 13 is the same as explained in connection with Fig. 1 but in the modified structure the carbon ring is eliminated and the resinous member which cooperates with the gland has a different shape. This member indicated at 22 takes the form of an elongate cylinder having a rounded edge indicated at 23 at one end to fit snugly the fillet between the hub member 1 and the interior surface of the extension 19. The opposite end of the member 22 is provided with a tapered surface indicated at 24 for receiving the tapered end of the gland 13. The cylindrical member 22 and also the gland 13 may be made of a resinous material such as tetrafluoroethylene or a copolymer or an interpolymer of this material.

When the gland is pressed to the right by rotating the bolts 17 a sliding contact is established at the tapered surfaces of the members 13, 22 to form a strictly fluid joint, and in addition to cause the tapered end of the member 22 to move slightly outward due to the flexible character of the resin. There is also a slight compressing effect exerted by the interior surface of the gland 13 on the shaft 5 which assures a tight fluid joint at this position. However, little or no friction will be developed on account of the low coefficient of friction of the material out of which the element 13 is made.

From the foregoing it is evident that I have disclosed an improved form of seal which does not require the ordinary types of packing but instead all of the sealing parts are made of a solid, hard wearing material. The seal will obviously have long life in effectively preventing the creepage of pressure fluid along the shaft and also in withstanding any chemical attack by the fluid even under elevated temperature conditions. The sealing parts made of resin, particularly in the case of tetrafluoroethylene resin, hold their shape since material of this character is known to have little or no extruding ability. It is also evident that when the parts 10 and 13 are properly designed, they can be placed in standard sealing structures which have already been designed for pumps on the market and which normally employ fibrous packing. It is simply a matter of removing these packing elements and substituting therefor the two solid elements 10 and 13 in which case the same gland plate 15 can be employed to apply pressure at the seal.

It will be understood that various modifications and arrangements in structure could be made without departing from the spirit of my invention and, accordingly, we desire to comprehend such modifications and substitutions of equivalents as may be considered to come within the scope of the appended claims.

Having thus fully described my invention, what I claim as new and desire to secure by Letters Patent is:

1. In a shaft seal comprising a hollow hub having an interior surface adapted to enclose a rotating shaft, a rotatable collar located adjacent one end of said hollow hub, said collar having substantially flat walls one of which faces inwardly of said hollow hub, a ring of lubricating material having substantially flat end walls, one of said end walls contacting the inwardly facing end wall of said collar, a cup within said hollow hub bearing against an end wall of said ring of lubricating material, said cup having an inwardly inclined inner surface, a gland having an extension provided with an exteriorly inclined surface engaging the inwardly inclined surface of said cup, and means for bringing said inclined surfaces into contact one with the other to expand said cup and form a fluid tight joint against said inner surface of said hollow hub and press said flat surfaces into sealing engagement, said cup being composed of tetrafluoroethylene resin.

2. In a shaft seal comprising a hollow hub having an interior surface adapted to enclose a rotating shaft, a rotatable collar located adjacent one end of said hollow hub, said collar having substantially flat walls one of which faces inwardly of said hollow hub, a ring of lubricating material having substantially flat end walls, one of said end walls contacting the inwardly facing end wall of said collar, a cup within said hollow hub bearing against an end wall of said ring of lubricating material, said cup having an inwardly inclined inner surface, a gland of non corrosive metal having an extension provided with an exteriorly inclined surface engaging the inwardly inclined surface of said cup, said cup being composed of tetrafluoroethylene resin, and means for bringing said inclined surfaces into contact one with the other to expand said cup and form a fluid tight joint against said inner surface of said hollow hub and press said flat surfaces into sealing engagement.

3. In a shaft seal comprising a hollow hub having an interior surface adapted to enclose a rotating shaft, a rotatable collar located adjacent one end of said hollow hub and mounted on said shaft, said collar having substantially flat walls one of which faces inwardly of said hollow hub a ring of lubricating material, having substantially flat end walls, one of said end walls contacting the inwardly facing end wall of said collar, a cup within said hollow hub bearing against an end wall of said ring of lubricating material, said cup having an inwardly inclined inner surface, a gland having in extension provided with an exteriorly inclined surface engaging the inwardly inclined surface of said cup, said cup and gland being composed of tetrafluoroethylene resin, and means for bringing said inclined surfaces into contact one with the other to expand said cup and form a fluid tight joint against said inner surfaces of said hollow hub and press said flat surface into sealing engagement.

DELBERT E. JACK.

REFERENCES CITED

The following references are of record in the file of this patent:

UNITED STATES PATENTS

| Number | Name | Date |
|---|---|---|
| 134,955 | Welch | Jan. 14, 1873 |
| 583,451 | Brady | June 1, 1897 |
| 1,035,484 | Shahan | Aug. 13, 1912 |
| 1,603,556 | Platt et al. | Oct. 19, 1926 |
| 1,644,489 | Pitman | Oct. 4, 1927 |
| 1,898,278 | Weis | Feb. 21, 1933 |
| 2,393,967 | Brubaker | Feb. 5, 1946 |

FOREIGN PATENTS

| Number | Country | Date |
|---|---|---|
| 266,479 | Great Britain | 1927 |
| 308,651 | Germany | 1931 |